United States Patent [19]

Ozols

[11] Patent Number: 4,528,851
[45] Date of Patent: Jul. 16, 1985

[54] FORCE RESPONSIVE DEVICE

[76] Inventor: Karlis V. Ozols, 44 Thorne Ave., Mount Kisco, N.Y. 10549

[21] Appl. No.: 511,507

[22] Filed: Jul. 6, 1983

Related U.S. Application Data

[60] Continuation-in-part of Ser. No. 236,874, Feb. 23, 1981, abandoned, which is a division of Ser. No. 965,784, Dec. 1, 1978, Pat. No. 4,312,227, which is a division of Ser. No. 790,045, Apr. 22, 1977, Pat. No. 4,138,600.

[51] Int. Cl.³ .............................................. G01P 15/08
[52] U.S. Cl. ............................ 73/516 LM; 200/61.46; 200/61.47
[58] Field of Search .................. 73/515, 516 LM, 511, 73/503; 200/61.47, 61.46; 338/44

[56] References Cited

U.S. PATENT DOCUMENTS

| | | | |
|---|---|---|---|
| 1,319,036 | 10/1919 | Barus | 73/503 |
| 2,983,149 | 5/1961 | Lees | 73/516 LM |
| 3,024,662 | 3/1962 | Ryan | 73/516 LM |
| 3,992,951 | 11/1976 | Erspanger | 73/516 LM |
| 4,028,815 | 6/1977 | Buckley et al. | 73/516 LM |

FOREIGN PATENT DOCUMENTS

| | | | |
|---|---|---|---|
| 45-4205 | 2/1970 | Japan | 73/516 LM |
| 75977 | 11/1932 | Sweden | 73/515 |

Primary Examiner—Stewart J. Levy
Assistant Examiner—John E. Chapman, Jr.
Attorney, Agent, or Firm—Peter K. Kontler

[57] ABSTRACT

A device is provided for use in measuring acceleration and deceleration of a rotating body. The device includes a housing having wall means which define an endless flow path. The housing is rotatable about an axis which passes through the center of or is eccentric to the housing. The flow path includes a plurality of interconnected chambers with capillary passages therebetween. Electrically conductive flow medium is contained in the path and is adapted to travel about the path upon rotation of the housing about the axis. Monitoring means are provided at preselected positions about the path for sensing the presence or absence of medium at said positions and, further, to measure the amount of medium in each of said chambers.

22 Claims, 19 Drawing Figures

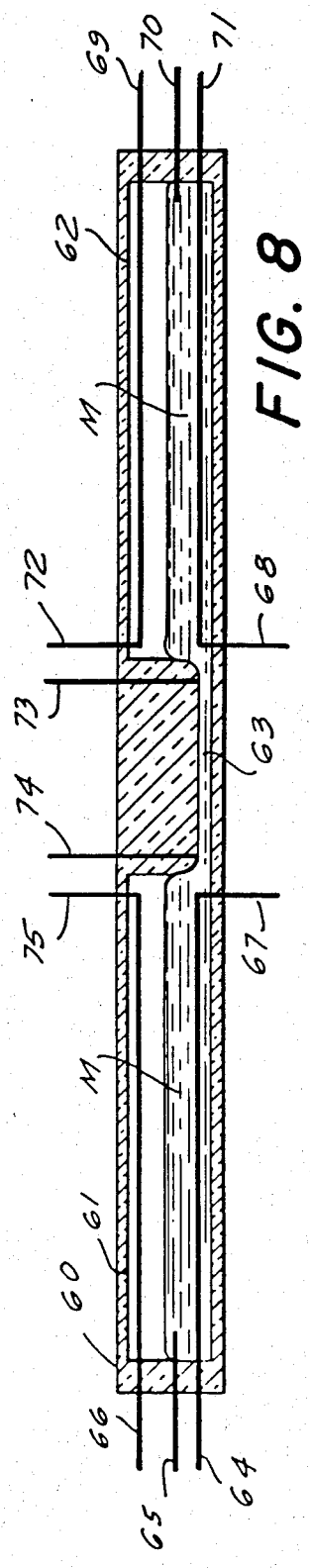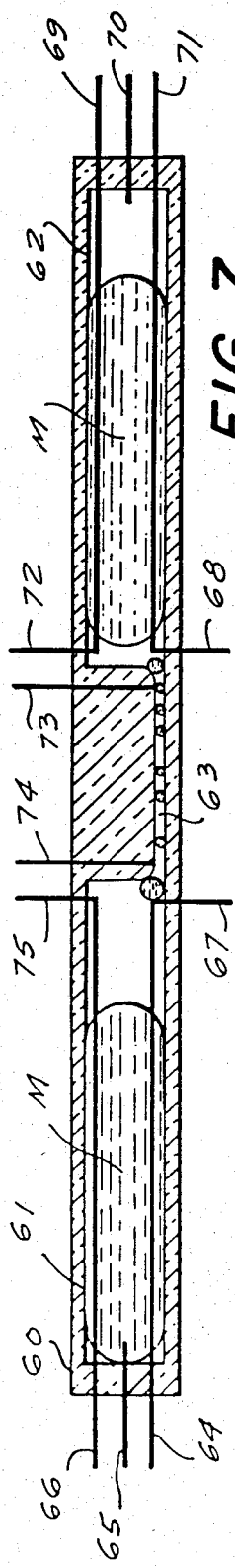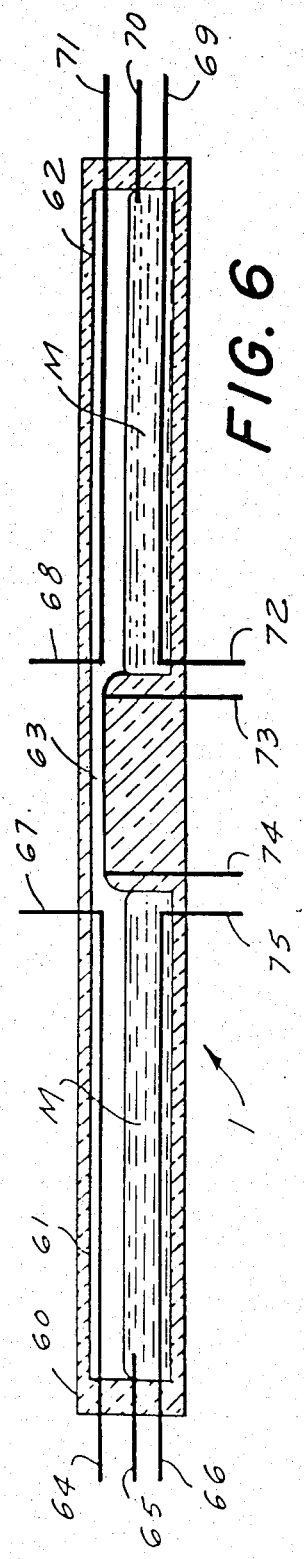

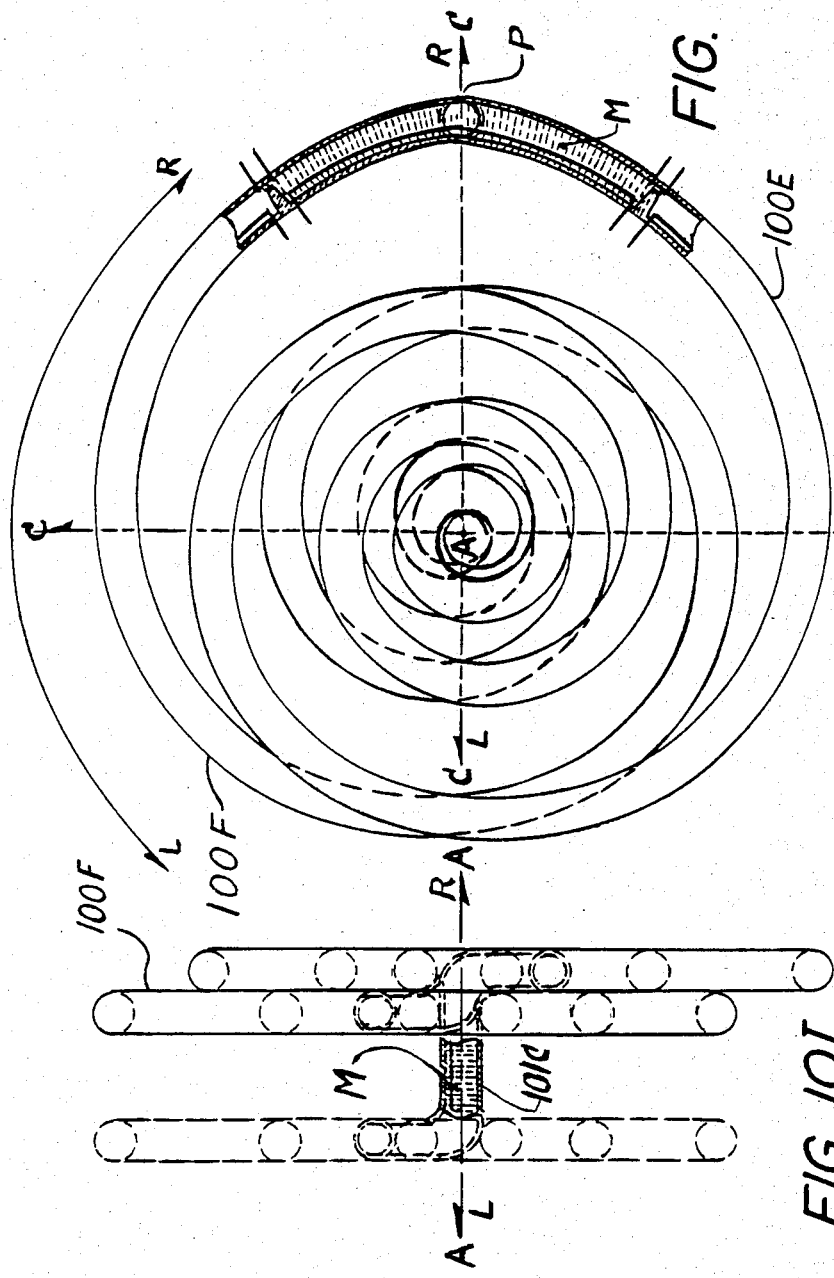
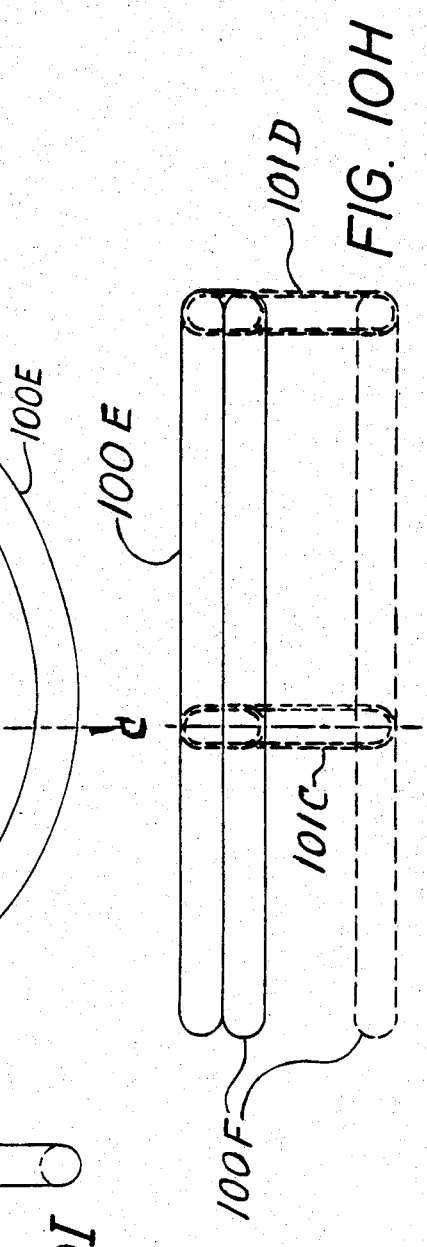

FORCE RESPONSIVE DEVICE

RELATED APPLICATIONS

This application is a continuation-in-part application of Ser. No. 236,874 filed on Feb. 23, 1981, now abandoned, which was a division of application of Ser. No. 965,784 filed on Dec. 1, 1978, now U.S. Pat. No. 4,312,227 granted on Jan. 26, 1982 which, in turn, use a division of application Ser. No. 790,045 filed on Apr. 22, 1977, now U.S. Pat. No. 4,138,600 granted on Feb. 6, 1979.

BACKGROUND OF THE INVENTION

This invention relates generally to a force-responsive device and more particularly, to a force-responsive device capable of measuring time intervals, and still more specifically to a device which is actuatable by changes in velocity, by gravity, by centrifugal force and/or other forces as will become apparent hereinafter.

The device, according to the present invention, may advantageously be integrated with an electrical switch and/or be connected to electrical signal-generating means.

Devices of the type disclosed herein are especially well suited for applications in rocketry and space-flight, but are not limited to such applications. They can be employed to control the acceleration of a rocket or missile, as well as in the programming a multi-stage firing and instrumentation. Devices known from the prior art for such applications are not satisfactory for reasons known to those skilled in the art, including their large size and weight, complexity of construction and, in many instances, lack of reliability.

There are a great number of commercial applications also. Another application of this device is that of a gravity-deceleration time fuze for smaller caliber field piece projectiles, including bazookas. It is particularly applicable for the ignition of the rocket fuel of a projectile in flight, i.e., after the initial ballistic firing of same.

SUMMARY OF THE INVENTION

It is an object of the invention to provide a force-responsive device which is simple both as to its operating principle and its construction.

A further object of the invention is to provide such a device which is highly reliable in operation.

A concomitant object is to provide a device which is light weight and requires relatively little space, two consideration which are of particular importance in the application of the novel device for rocketry and space flight applications where both weight and space are at a premium.

Still another object of the invention is to provide such a device which, while not limited thereto, is of particular advantage in rocketry and space-flight programming, staging and instrumentation.

In keeping with these objects and with others which will become apparent hereafter, one feature of the present invention resides in an inertia-responsive device for use with a movable body, e.g., such as a single-stage or multi-stage rocket, which is capable of acceleration and/or deceleration. The novel device may comprise container means (e.g., of electrically insulating material, such as synthetic plastic or glass) forming at least one recirculating compartment divided into sections by at least one flow-restricting passage.

A quantity of flowable material will be accommodated in the container means and be adapted to flow between the compartments and through the passage as a function of gravity and/or changes in the velocity acting upon the device.

The material may be electrically conductive and cooperate directly (i.e., by physical contact) with electrical means (described below) used to monitor the position and/or flow of the material. Suitable materials include mercury, any amalgam thereof, finely divided metallic particles or graphite, or minerals or salts of substantially uniform size (preferably spherical), or the proper electrolyte, or a combination thereof. If the device is to be responsive to changes (e.g., appearance of disappearance) of a magnetic field, the material will be a paramagnetic and/or ferromagnetic or diamagnetic material, or magnetic fluid.

Electrical means are connected to the compartments and the passage and operative for monitoring the position and/or flow of the material in the container means. The electrical means may constitute switch means or it may constitute a signal-generating means or be connected to the latter.

The foregoing and other objects of the present invention will become fully apparent from the following description of some currently preferred embodiments of the invention, which should be read in conjunction with the accompanying drawing but should be understood to be exemplary only.

BRIEF DESCRIPTION OF THE DRAWING

FIG. 6 is a diagrammatic side elevational view of an additional embodiment of the invention in one position;

FIG. 7 is a view similar to that of FIG. 6 but showing the device in an alternative position;

FIG. 8 is a view similar to FIG. 6 but showing the device in still another position;

FIG. 10G is a partly sectional plan view of a further embodiment of the invention;

FIG. 10H is a partly sectional view as seen from the left-hand side of FIG. 10G;

FIG. 10I is a view as seen from the lower side of FIG. 10G; and

DESCRIPTION OF PREFERRED EMBODIMENTS

Figures 1, 2:
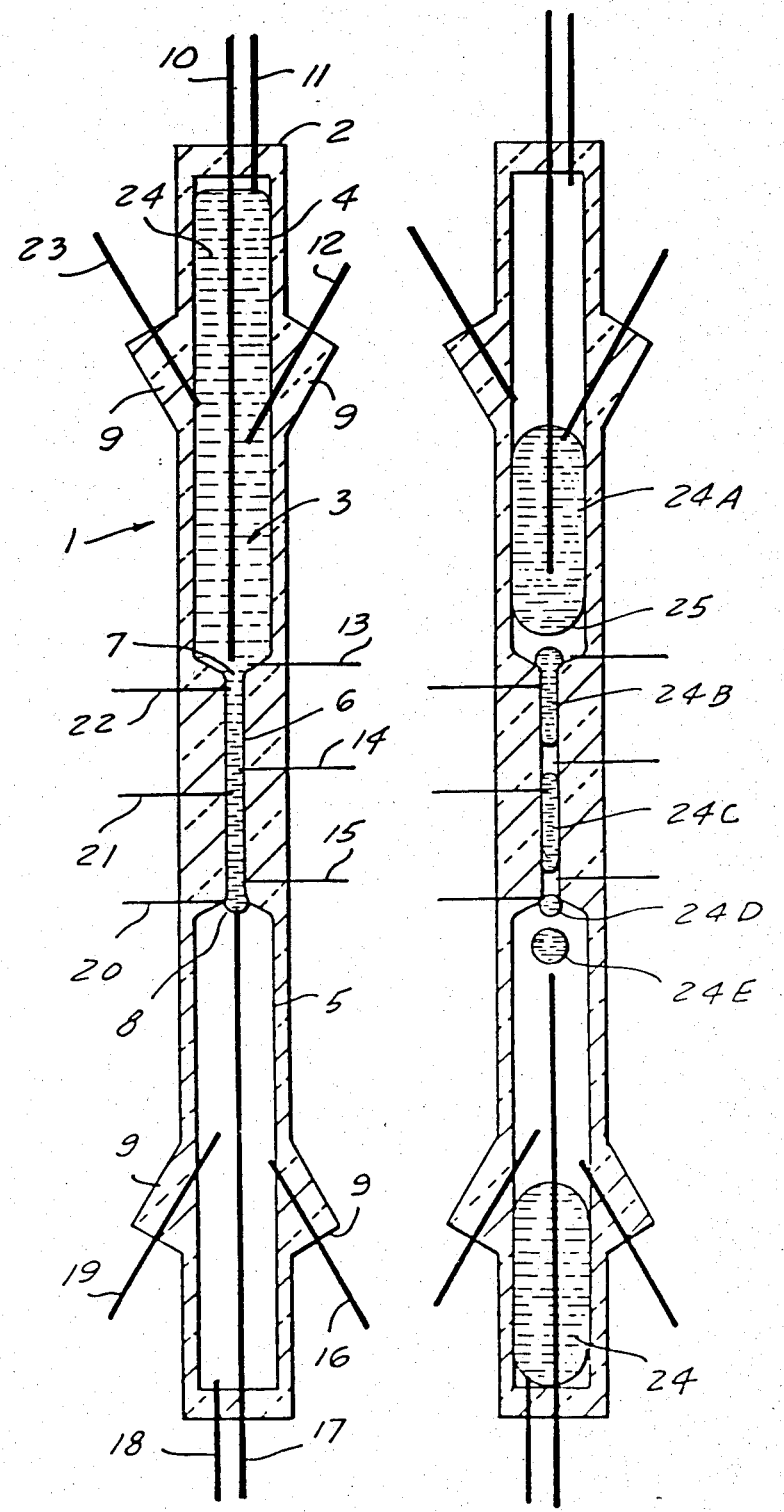
FIG. 1 is a diagrammatic side elevational view of one embodiment of the invention, in a first state.
FIG. 2 is a view similar to FIG. 1 but showing the device of that Figure in a second state.

Referring firstly to FIGS. 1 and 2, there is shown an embodiment of the invention in the form of a switch arrangement having an outer cylindrical housing 1 bounding within its walls 2 an interior hourglass-shaped container having an upper cylindrical chamber or compartment 4, a lower cylindrical chamber or compartment 5 and a connecting restricted passageway 6.

The upper chamber 4 is provided with electrical contact resistance elements 10, 11, 12 and 23, of which elements 12 and 23 extend into and through oblique bosses 9 of the housing 1. Lower chamber 5 has similar elements 16, 17, 18 and 19, of which elements 16 and 19 extend through additional oblique bosses 9 of the housing 1. Contact elements 10, 11 extend through the upper end of the chamber 4, parallel to the central axis thereof. The contact element 10 extends substantially to the beveled annular end face 7 of the upper chamber 4. This contact element or resistance electrode 10 terminates just slightly above the restricted connecting passageway 6. The electrode 11, on the other hand, terminates just inside the upper end of the chamber 4. The resistance elements 17, 18 have the same relationship to chamber 5 and end face 8 thereof as do the elements 10, 11 to chamber 4.

These various resistance contact elements may be formed by sealing metal wires or conductive filaments into the wall of container 3.

It will be noted that the oblique contact element 23 extends just slightly upwardly through the side wall of the chamber 4, whereas the element 12 extends closely adjacent to the central axis contact element 10 of the upper chamber 4. These various elements may also be adjustable within the chamber 4, being mounted to be shiftable lengthwise of themselves with suitable means being provided for sealing them to the walls through which they pass.

Along and adjacent the restricted neck passageway 6 are the electrodes 13, 14, 15, 20, 21 and 22.

These electrodes extend transversely into and through the wall 2 of housing 1 and into the inner container, and they are arranged in pairs 13 and 22, 14 and 21, and 15 and 20, slightly offset from one another.

In the lower chamber 5 there is a duplication of the elements already discussed above, and as shown in FIG. 1.

In the embodiments of FIGS. 1 and 2, the housing and container 3 may be of glass, plastic, aluminum, steel, or other materials not subject to chemical or corrosive attack by the body 24 of fluid or flowable material or substance in the container 3. Desirably, the container material is of electrically insulating material or the contact elements are insulated from such material by suitable sliding or sealing contacts. The contact elements themselves may be slidable bars or wires of copper, aluminum, graphite or carbon or any other suitable electrical conductor.

In this embodiment the capillary adhesion of medium M and the surface tension of the latter, coact with the force of acceleration or deceleration to make the embodiment operate in the capacity of a valve; the contact medium flow may commence at the outset of a predetermined rate of acceleration or deceleration, or at the instant of initial acceleration or deceleration, by precalibration of the device, which is based on the electrical resistance variation rate through the resistance electrodes 10 and 17.

In operation the contact medium M may be statically balanced (i.e., due to surface tension and friction against the surface of passage 6) until the required acceleration or deceleration rate is reached. The axis of the device of FIG. 1 may be set to be fully or substantially coincident with the direction of acceleration or deceleration of the moving body, e.g., rocket. Normally, the volume and capacity of the chambers 4 and 5 and the construction of the passageway 6 are so selected that an amount of the substance 24 will remain in contact with the elements 13–15 and 20–22 at all times, and also with the ends of the elements 10 and 17.

At the extremes of the measurement in either direction, the elements 10 and 11, and 17 and 10, and 18 will be in electrical communication. Normally, in intermediate positions the elements 12, 23, 16, 19, 13, 14, 15, 20, 21, 22, 10, 17 and 18 (all except 11) will also be in electrical communication. As shown in FIG. 2, where mercury or a suitable electrolyte, or other finely divided conductive flowable material is utilized, such as powdered metal or powdered graphite particles or other powdered electrically conductive material, or any proper combination thereof, the flowable material will separate into two or more bodies, 24A–24E, e.g., adjacent the faces 7 and 8 at the inlets of the restrictive passage 6 or e.g., in reverse direction against the bottom and wall of chamber 5 and the lower inlet of the restrictive passage 6.

Even if the embodiment of FIGS. 1 and 2 is positioned at an angle of, say 45°, to the direction of motion, it would be subject to components of force in both directions, such as laterally and forwardly and rearwardly, to give some measurement of the directional movement in two directions at angles to one another. (The resultant of the vector field.)

Figure 3:
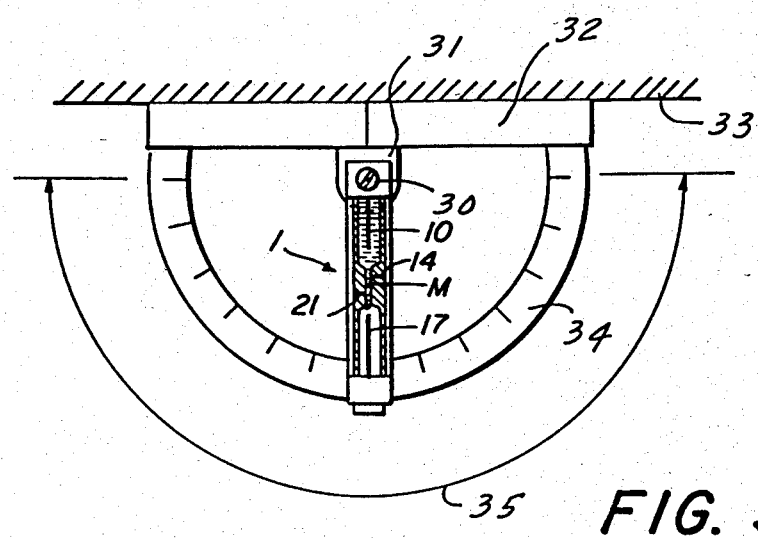
FIG. 3 is an elevational view showing a further embodiment of the invention.

Referring to FIG. 3, the device of the invention is shown pivotally mounted at 30 upon a support 31 which has a base 32 mounted on a wall 33. The device 1 is adjustable over 180°, as indicated by the arcuate arrow 35, and is not limited to, but could be optionally 360°. The exact position may be determined by means of the arcuate graduated scale 34 with reference to which device 1 may be fixed by e.g., a set-screw (not shown).

Figure 4:
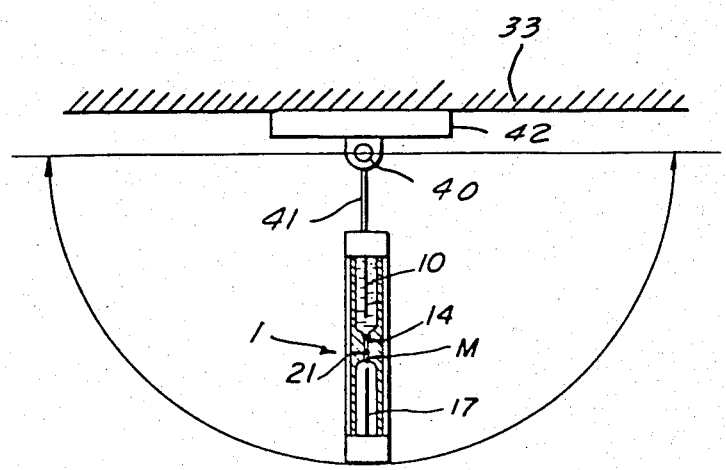
FIG. 4 is a view similar to that of FIG. 3 but illustrating another embodiment.

In the embodiment of FIG. 4, the device 1 may swing freely (i.e., analogously to a free pendulum within a solid angle) from the connection 41 to the ball pivot 40 which is mounted via a block 42 upon the wall 33. By swinging to an inclined position determined by the movement of the vehicle, the acceleration or deceleration may be measured.

Figure 5:
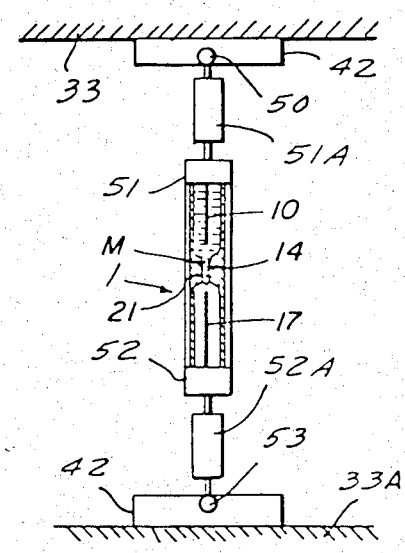
FIG. 5 is a view which is also similar to FIG. 3 but which illustrates yet another embodiment.

In FIG. 5, the device 1 is mounted between two end caps 51, 52 which in turn have extensible connections 51A, 52A connecting them via blocks 42, at respective pivots 50, 53 to suspended between the wall structures 33 and 33A which are relatively free in respect to each other or displaceable in space to reorient the device 1 and monitor the obliqueness accordingly.

In the arrangement shown in FIG. 5, the wall structures 33, 33A may be moved in respect to each other to set the device 1 to an oblique position.

The electrodes shown in FIGS. 3–5 are representative of any combination of electrodes, such as those electrodes which are shown in FIGS. 1 and 2.

When the container is set (or adjusts itself, as in the case of the pendulum mount) to extend parallel to the gravitational pull—i.e., in line to the center of the earth—as e.g., a rocket is launched (rockets are launched vertically, as a rule), then the force acting on the device will be composed of gravitational pull and acceleration. The medium M, which was retained against flow by its surface tension until acceleration began, will then flow through the orifice(s) at a rate governed by these two forces acting on it. Rockets, however, remain in vertical flight only for a relatively short time and then begin to veer off (from the original flight trajectory) to enter their controlled optimum trajectory, e.g., to enter a trajectory which will permit the spin-stabilized insertion into orbit. If the container is fixedly mounted it will share in this attitudinal change of the flight vehicle, i.e., the flow path in the container will become inclined to the original flight axis in the same manner as the vehicle is inclined thereto. This will influence the rate of flow of the medium M through the orifice, because there will now be a component of force (e.g., gravity) acting on the flow medium transverse to the flow path, instead of lengthwise of it as during the initial vertical flight. If, however, the container is mounted as a pendulum, it can automatically readjust its position as the flight vehicle veers off the original vertical flight trajectory; in other words, the container, device 1 and the flow path may swing to any inclined position as a free pendulum within a solid angle, and oscillate and rotate in any direction as effected by the movements of the vehicle, either acceleration or deceleration, and is also subjected to the various and diverse forces of the vector field, summarizing the resultant orientation automatically computed and executed as programmed accordingly until an equilibrium is attained at zero G.

The embodiment in FIGS. 6 and 8 shows the device in a longitudinally parallel to the horizontal position, with outer housing 60 and with the inner container having chambers 61, 62 and restricted passage 63, and this device is rotatable 180° about its longitudinal axis for commencement or for the termination of flow of the contact medium.

The chamber 61 is located at the left and the chamber 62 at the right; they contain electrically conductive fluid or flowable material M. The electrical connections, as shown, are somewhat different from those shown in FIGS. 1 and 2. To the restricted passage 63 there are electrical connections at the ends thereof, namely 67, 74 and 75 at one end and 68, 72 and 73 at the other end.

The chamber 61 has electrical connections 64, 65 and 66 whereas chamber 62 has similar connections 69, 70 and 71; in both chambers the connections are at the respective outer ends.

It will be noted that the passage 63 is shown in FIGS. 8 and 7 in a lowermost position and that in FIG. 6 the passage 63 is shown in an uppermost position.

The electrical contact elements may be sealed within the wall of the container or they may be slideable lengthwise of themselves from outside the container. These contact elements are situated at the initial level of the contact, and are adjustable in depth within the contact medium M, for variation of the resistance value, and/or to change the instant of breaking the circuit, when said contact medium M begins to flow through the restrictive orifice formed by the passage 63. This condition prevails at both ends of the container.

Additional contact elements could be placed at predetermined intervals, or along the entire length of the passage 63.

These contact elements may be employed to program and make and break circuits at any predetermined time intervals. The time interval for making or breaking contact between any given set of contact elements would be varied by the rate of flow of the medium M which depends upon the gravitational force or changes of velocity to which the novel device may be subjected. In fact, the device provides means to record the change of velocity rate and inertia.

The housing is a structural part which is used as a means for retaining and mounting the container proper, with a bracket for setting a predetermined elevation angle, for time-delay variations.

Adjustment control means for time-delay variations may be provided. For example, it is possible to use adjustable electrical contact elements, adjustable in relation to the top level surface of the contact medium M, or to the electrical resistance of the contact medium, which is determined by the cross-section and the relative distance between the said contact elements.

Adjustment control of the elevation tilt angle relative to the horizontal plane is also possible and this will affect the flow rate of the contact medium M by the variation of head pressure, gravity, centrifugal force, angular and linear acceleration or deceleration.

In the case of a stationary condition of the body (e.g., rocket) in which the device is employed, the flow rate of the contact medium M varies as the sine of the tilt angle included with the horizontal plane, which is normal to the gravitational force line, which would be modified by the correction factors of flow friction, viscosity, head pressure, hydrodynamics of the orifice (passage) configuration, and length of (passage) orifice.

The same would apply, as stated above, if the device were subjected to acceleration or deceleration, and/or centrifugal forces, except that the flow rate of medium M would be affected by the value of the resultant of the force vectors and the contact-medium inertia factors.

This device also provides means for registering the instant of free fall or of a cessation of changes in velocity.

Vibrations would cause the stream of the contact medium to be ruptured into separate droplets (see e.g., FIG. 2); consequently, this could be signalled as interruptions of the continuity in the circuit current, which would correspond substantially to the vibrating frequency, or an irregular sequence, as the causative factor might be.

The contact medium M should be enclosed in the container, preferably under hermetically sealed conditions, within an insert gas atmosphere, such as helium, or in a vacuum in order to prevent the inert gas from interfering with the normal flow of the contact medium, or by-pass may be required for the gas to flow freely from the chamber out of which it is being displaced by the contact medium M into the chamber from which contact medium passes out.

Recycling of the contact medium flow, at the same rate, in one direction and/or in reversed direction, could be obtained by providing means for rotating the container through 180°. The recycled 180°-reversed flow rate would be the same as in the initial phase flow, if the second section or chamber is hydrodynamically similar to the first section or chamber.

A different flow rate could also be attained for the recycled 180° reversed-flow, if the sections and the corresponding ends of the orifice or passage were hydrodynamically different.

The programming sequence could be reversed by the recycling if so required.

Any plurality of separate containers may be interconnected in parallel (simultaneous flow) to a common pool or reservoir for the contact medium, at either or both ends of the containers, for certain kinds of programming.

Any plurality of separate containers may be interconnected at either or both ends for a circulating or sequential (in series) flow, when recycled, with or without a contact medium in each container, if required for programming.

Any plurality of separate containers may be connected in a series, for sequential flow, with or without a contact medium in each, for special programming.

Any plurality of separate containers may be connected, in a series, for sequential re-circulating flow, with or without a contact medium in each. This may be particularly applicable, though not necessarily be limited to, the employment of the inertia of the contact medium, in the change of angular velocity. The preferable configuration of the containers in a series for re-circulating flow would be a circular or spiral shape, (Ref. FIG. 10) the center of which would coincide with the rotational center of the container, or could be eccentric, as required.

The mounting method of the novel device, relative to the rocket or other movable body, may be stationary, spring suspended, oscillating, rotating, or suspended as a free pendulum, depending on the required condition.

Figure 9:
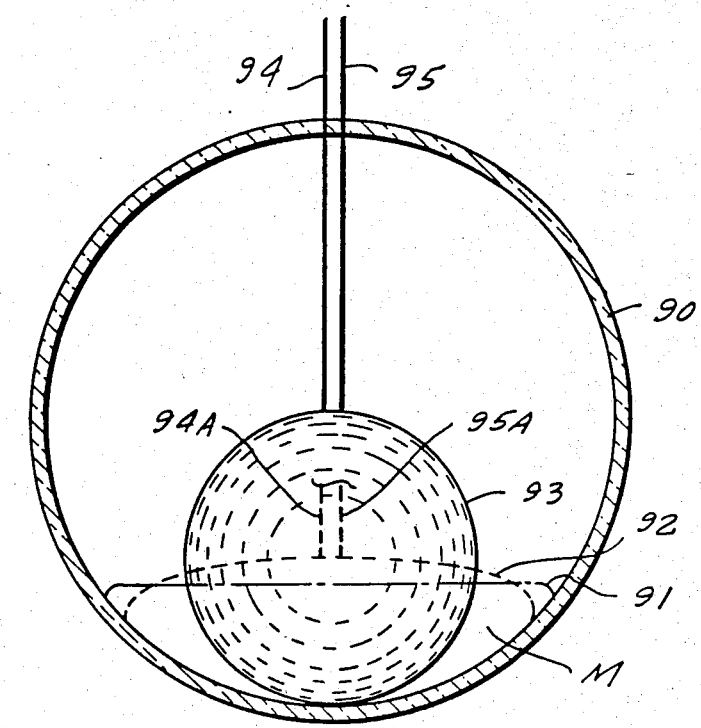
FIG. 9 is a diagrammatic elevation showing an additional embodiment.

A further embodiment of the invention is shown in FIG. 9, in diagrammatic form. The spherical, optionally gas evacuated housing of the device is designated with reference numeral 90 and contains body M of flowable medium. Under steady state conditions the surface of the body M is the one indicated as 91. The device of FIG. 9, however, is intended to detect the instant at which zero gravity (i.e., from free fall) commences and terminates. For this purpose it makes use of the surface tension of the medium M, i.e., the phenomenon that under zero gravity the surface tension of the medium will cause it to form into a globule, i.e., a spherical body 93.

When in steady state, e.g., subject to acceleration in the direction of the arrow U, the surface configuration 91 will obtain for the medium M. As a change in steady state occurs, e.g., as zero gravity condition approaches, the medium M will be influenced thereby and the surface 91 will change to the surface configuration 92. Two electrodes 94 and 95 extend through the housing 90 in suitable electrically insulated relationship. If it is desired to detect the approach of zero gravity, the ends of these electrodes could be located as at 94A, 95A, i.e., in such a manner that an electrical circuit will be closed across them when the ends 94A, 95A are contacted by the surface 92 of the conductive medium M. Of course, the electrodes 94, 95 may be mounted to be shiftable (or otherwise adjustable) lengthwise of themselves relative to the housing 90, so that their ends can be selectively placed into the positions indicated at 94A, 95A and/or to other positions closer to or farther from the surface configuration 91.

At the moment zero gravity occurs, the surface tension of the medium M will cause the same to contract into the shape of a spherical body 93. If the ends of the electrodes 94, 95 are so positioned (see the solid-line showing in FIG. 9) that they are just contacted by the surface of the newly-formed body 93—whose diameter can of course be precalculated, preferably half of the inside diameter of the spherical housing—then the circuit across the electrodes 94, 95 will be completed the moment free fall or zero gravity occurs and, hence, this will be an instantaneous indication that free fall has commenced. Conversely, of course, at the moment free fall terminates (i.e., some degree of gravitational force returns or a change of velocity or of the direction occurs) the spherical body 93 will begin to flatten out (and eventually return to the surface configuration 91); as this flattening-out begins the surface of body 93 will recede from contact with the ends of the electrodes 94, 95 and the circuit across the electrodes will be interrupted, providing substantially instantaneous indication that free fall is terminated.

Figure 11:
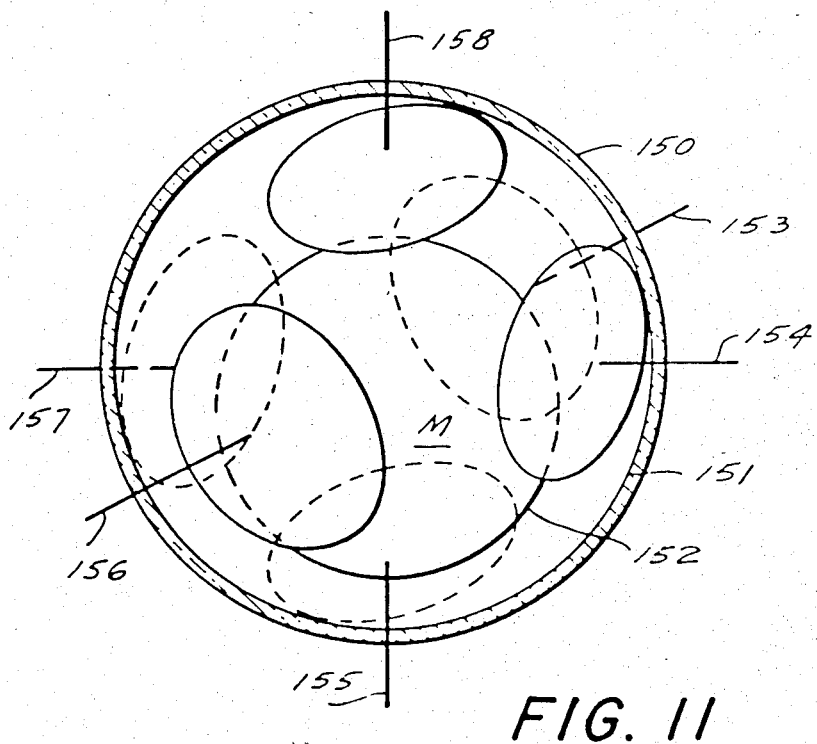
FIG. 11 is a side elevation, in diagrammatic form, of still another embodiment of the invention.

The embodiment of FIG. 11 makes use of the same phenomenon as in FIG. 9, except that here the housing is identified with numeral 150 and may be of spherical shape. Its interior 151 accommodates a body M of the flowable medium which under the influence of zero gravity again assumes spherical shape. The interior 151 is large enough to permit the sphere M, whose surface is indicated at 152, to float in the housing 150.

The spherical housing 150 is provided with six sensor plates of electrically conductive material and oriented respectively on three coordinate axes, orthogonal to each other as shown; each of these plates is connected to an electrode (i.e., electrical conductor) 153–158, respectively. The remainder of the electrical circuit is not shown, neither in this Figure nor in any of the others, since it does not form part of the invention and can be of any of the various electrical circuits known per se. The space in interior 151 that is not occupied by the medium M may be evacuated and then filled with a suitable gas or fluid like a magnetic liquid of greater buoyancy than the medium M; the purpose of this gas or fluid would be to dampen the oscillations of the medium M under free-fall conditions and/or such fluid may also serve as an electrolyte and/or as an electrically non-conductive substance, or for magnetic field detection.

When changes in the free-fall state occur, i.e., when the body in or on which the device of FIG. 11 is installed becomes subject to some gravity (e.g., due to acceleration or, in interplanetary space, due to the body entering the gravitational field of a celestial body) the spherical mass M will move relative to the sides of the housing 150, i.e., it will approach one side or set of sides and recede from the other. This will result in a change of capacitance in the circuit connected to the sensing plates via the electrodes 153–158 and will thus provide not only an indication that gravity is acting upon the device, but also in which direction the gravitational or magnetic pull or other forces are being exerted, and their magnitude; or that the vehicle is veering off course.

Instead of an arrangement using fluctuations in the capacitance of an electrical circuit, the device of FIG. 11 could make use of light beams which are interrupted by movement of the mass M within housing 150. The six light beams and photocells would be oriented and distributed in the same orthogonal system on three coordinate axes as disclosed above for FIG. 11.

The basic embodiment of FIG. 11 may be modified to utilize radioactive emission proximity detection means by adding powdered radioelements or isotopes thereof to the mercury medium M.

The emission proximity detection means would be utilized with emission detectors instead of electrical capacitance detecting means.

The radioaction powders with a lower density than that of mercury would, due to buoyancy, float to the surrounding surface of the mercury medium and would be retained at equal distribution on the surface by the surface tension of the mercury. At the freezing temperature of mercury −38.87° C., the radioactive substance powder particles would be solidified within the solid aggregate state spherical surface of the mercury medium M and still remain functional. The temperature in deep space approaches absolute zero, −273.16° C.

The schematic embodiments of FIG. 11 are similar in every respect, except the phenomenon means for the detection of the proximity of medium M.

Figure 10A:
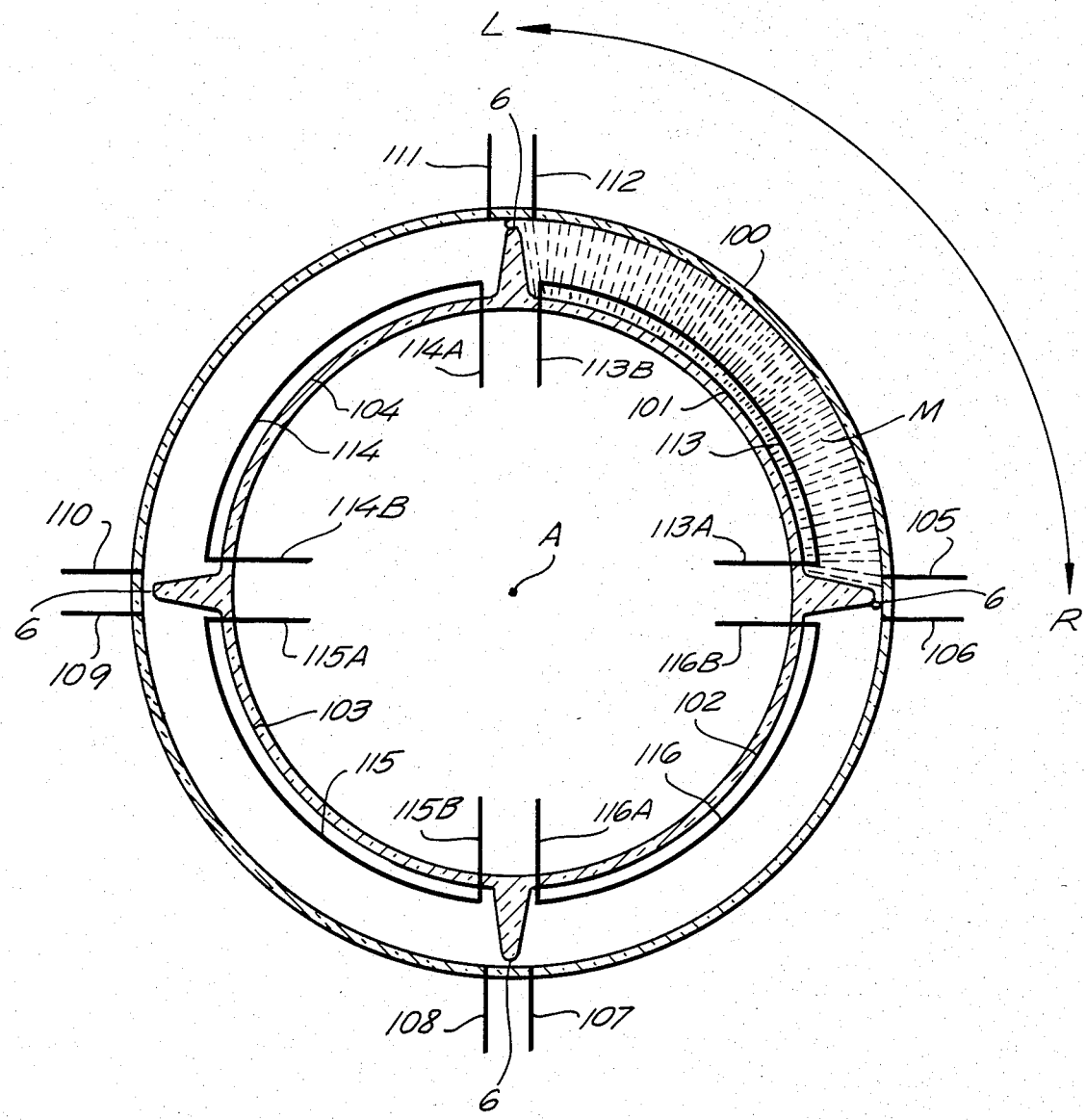
FIG. 10A is a diagrammatic top plan view of yet another embodiment of the invention in an unaccelerated mode.
Figure 10B:
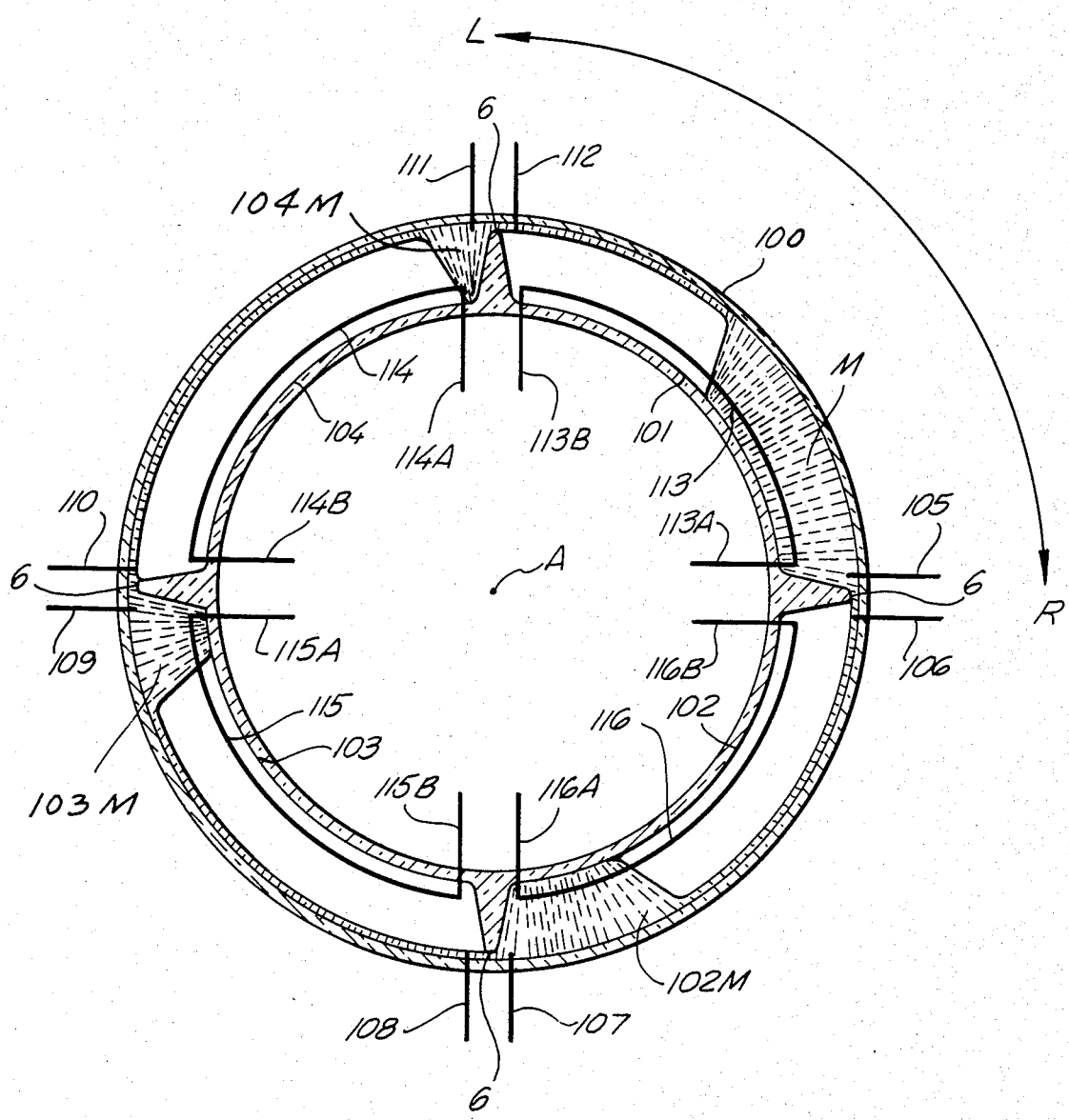
FIG. 10B is a diagrammatic top plan view of the embodiment of FIG. 10A after commencement of acceleration.

FIGS. 10A-10B show an embodiment in which the electrically conductive contact flow medium M is constantly recycled about a hollow toroidal housing 100 which includes a ring of interconnected chambers 101, 102, 103, and 104. FIG. 10A depicts the housing in an unaccelerated state while FIG. 10B illustrates the housing after the commencement of acceleration in direction "L".

The device of the embodiment of FIGS. 10A-10B is particularly adaptable for use in military applications where the housing 100 is rigidly mounted in a projectile with the center axis A coinciding with the ballistic dynamic center line of the projectile. Upon leaving the barrel of the gun, there is a linear deceleration of the projectile on its trajectory as well as a high rate of rotation of the projectile about its ballistic center. The device of FIGS. 10A-10B may be used to monitor linear acceleration and deceleration of the projectile and therefore permit the projectile to be detonated at any required instant in the trajectory. Control means for detonation may be included in the projectile or data may be transmitted to a fire control center or the like.

The device of FIGS. 10A-10B has specific applications in monitoring aerodynamic axial-angular orientation: in monitoring angular rotation of the spinning rate of a missile about its axis at any required instant and point in its trajectory; in monitoring aerodynamic gyroscopic stability and its effect; in monitoring the phenomenon of drift and the required correction coefficient; in monitoring the earth's rotation effect and trajectory; in monitoring the variations of gravitational constant due to latitude and altitude changes; and in monitoring atmospheric aerodynamic deviation effects.

The deviation of the axis of a missile or other projectile from its trajectory is detectable through the periodic variations of the flow medium M contained in the device used on a constant rate of rotational period. This results in the transmission of a proportionally precalibrated signal of preponderant magnitude in the form of periodically fluctuating electrical resistance signals which register and become detectable directly or through a computerized data system transmitted to the control base.

Each chamber 101-104 of housing 100 is preferably of equal size, is evacuated of any gas, and is hermetically sealed. The sizes of the chambers 101-104 may, if desired for specific applications, be of different size. Moreover, virtually any number of interconnected chambers may be used so long as they are connected in series. Flow-restricting capillary orifices or passages 6 are provided between each of the interconnected chambers 101-104 to form, around the entire interior of the housing 100, a single, interconnected space separated by one or more flow-restricting capillary orifices or passages 6. The capillary passage 6 are preferably provided along the outside perimeter walls of the chambers 101-104 in order to facilitate free stream flow of the flow medium M along the outer perimeter edge of the chambers 101-104. Capillary orifices 6 are preferably hydrodynamically identical and are precalibrated for identical rates of flow and quantity per pressure and time units. The capillary passages 6, may, however, also be hydrodynamically modified for different rates of restricted flow according to the specific requirements of desired applications.

Outer contact electrode terminals 105, 106, 107, 108, 109, 110, 111 and 112 are provided at spaced intervals about the outer perimeter of the housing 100 extending into the chambers 101-104 at predetermined locations. The outer ends of electrode terminals 105-112 extend outwardly from the housing 100 and are connected in a manner which will be described infra. Similarly, at least one resistance electrode 113, 114, 115 and 116 is provided in each of the chambers 101-104 of the housing 100. Each of the resistance electrodes 113-116 includes at least two terminals 113A and 113B; 114A and 114B; 115A and 115B; and 116A and 116B, respectively, which extend outside of the housing 100. For example, as shown in FIG. 10A, a typical resistance electrode 113 is provided in chamber 101 which extends from terminal 113A to terminal 113B. Resistance electrode 113 extends over the entire length of the chamber 101 from one separating wall to the other. Contact electrode terminals 112 and 105 each protrude into the chamber 101 in relatively close proximity to the adjacnet capillary passage 6. The lengths of the terminals 112 and 105 are adjustable and the latter are hermetically sealed. Similar resistance electrodes 114, 115 and 116 are provided in chambers 104, 103 and 102, respectively. Similarly, pairs of contact electrode terminals 110 and 111, 108 and 109, and 106 and 107 are provided for each of chambers 104, 103 and 102, respectively.

Resistance electrodes 113-116 may be fabricated from materials such as, for example, nichrome and may similarly be placed in a variety of predetermined locations within the chambers 101-104 as desired.

By monitoring the electrical conductivity or resistance values between terminals of the resistance electrodes 113-116 and comparing these values against pre-established resistance values in an unaccelerated state, one is able to monitor the rate of the flow of the flow medium M from the initial chamber 101 during acceleration. The resistance value measured by resistance electrodes 113-116 is inversely proportional to the amount of flow medium M in that chamber 101-104. Thus, by monitoring the resistance values of resistance electrodes 113-116 and comparing the values against known "unaccelerated" values, one is able to monitor the flow of flow medium M as it travels from chamber 101 into chambers 102, 103 and 104 during acceleration in direction "L". Terminals 113A and 113B are wired together so that the resistance values along resistance electrode 113 may be measured and the value thereof transmitted to an external computer (not shown) for comparison and analysis. Similarly, terminals 114A and 114B of resistance electrode 114; terminals 115A and 115B of resistance electrode 115 and terminals 116A and 116B of resistance electrode 116 are all interconnected so as to permit determination and transmission of the resistance values of their respective resistance electrode to the computer. It has been found that when the chamber in which the resistance electrode is contained is filled with flow medium M, the resistance value for the resistance electrode therein is at the lowest. As the relatively conductive flow medium M leaves the chamber, the resistance value of the electrode in that chamber increases. The resistance value for each of the resistance electrodes 113–116 is pre-established so that as the resistance values change, the computer is capable of calculating the amount of change, the location of change and the speed of change and then, by comparison with such preprogrammed values, can calculate the rate of acceleration and/or deceleration.

Outer contact electrode terminals 105–112 as well as the terminals of the resistance electrodes 113–116 are further utilized for the sensing of the presence or absence of flow medium M between selected contact terminals. Contact terminals 105–112 and the terminals of resistance electrodes 113–116 are each connected to a network (not shown) which permits the constant monitoring of the presence (or absence) of flow medium M between preselected contact terminals with a resultant signal being transmitted to a computer for processing so as to determine where the fluid medium M is provided within the housing 100 as well as the time it took for the medium M to travel from one point to another. As shown in FIG. 10A, when the housing 100 is in a stable, unaccelerated position, the resistance value of the resistance electrode 113 would be at its lowest point because the chamber 101 is substantially completely filled with flow medium M. Similarly, the network would transmit to the computer a signal indicating that there was electrical contact (due to the presence of conductive flow medium M) between terminals 112 and 113B and between terminals 113A and 105.

Upon acceleration of the housing in direction "L", flow medium M begins to pass through capillary passage 6 and into adjacent chamber 102. The commencement of acceleration is detected by the network's sensing of electrical contact between contact terminals 105 and 106.

Housing 100 is mounted on a driven rotary shaft about axis A or it may be freely turnably mounted on a pivot about axis A. The housing 100 may be rotated independently about the axis A relative to its carrying body, i.e., the projectile, missile, etc., and rotation may be additive or subtractive to the rotation of the projectile. The rotational rate of the carrying body may be too slow in order to effect the initiation of flow of flow medium M from initial chamber 101. Additionally, the rotational rate of the body may be too high and the rotational direction of the device should therefore, be in a reverse direction or, subtractive rotation, preferably at a constant rate in order to simplify the monitoring signal data for computing and programming.

The operation of the device of FIGS. 10A–10B is essentially the same as the basic operation described with respect to FIGS. 1 and 2 although the embodiment of FIGS. 10A–10B relies upon centrifugal force and the associated inertia of the contact flow medium M during acceleration and deceleration of the housing 100 about axis A in either direction or when the direction is reversed.

As shown in FIG. 10A, when housing 100 is in an unaccelerated state, the flow medium M is initially contained in one reservoir chamber 101 which is filled to capacity. Flow medium M, which is electrically conductive, may be, for example, any suitable electrically conductive liquid or powder such as, for example, amalgams of mercury, metal salts, metal powders such as micro-spherical graphite powder or a mixture of conductive liquids and current-conductive powders or magnetic fluids. As rotation of the projectile (and the housing 100 which is rigidly attached thereto) commences in direction "L", due to the accelerating centrifugal forces and initial inaction in the "R" direction, the flow medium M begins to flow outwardly from reservoir chamber 101, through capillary passage 6 and sequentially into succeeding chambers 102, 103 and 104 and so on as shown in FIG. 10B.

The flow of flow medium M commences at the instant of rotational acceleration of housing 100 about the center axis A which is positioned perpendicular to the plane of rotation in either direction "L" or "R" and may be reversed as required. Flow is effected by the initial head pressure of the flow medium M and the centrifugal force during angular acceleration in the "L" direction. The flow medium M is forced, by its own inertia, out of chamber 101 through capillary passage 6 and continues to flow in a thin stream along the peripheral wall of chamber 102. The stream of fluid medium M is intercepted by the separating wall between chambers 102 and 103 where the flow medium begins to accumulate in a pool 102M with only a fraction of the flow medium passing through capillary passage 6 because of the progressively lower hydraulic head pressure in comparison with that of chamber 101. This process continues into chamber 103 and chamber 104 with the flow medium M flowing back into chamber 101.

Retarded flow phenomenon is typical of the flow medium M passing through the capillary passage 6 between each successive chamber 101–104 which occurs at a progressively slower rate of flow and accumulation. This is generally a time/volume factor which is subject to the variations of hydrokinetics, hydrodynamics and hydrostatics as required by the particular requirement. Recirculation of the flow medium M continues from chamber to chamber for so long as acceleration continues. It will, of course, be appreciated that acceleration and, therefore, recirculation, continues only for a limited period of time.

There are a number of different combinations possible for the connection of the terminals of the resistance electrodes 113–116 in order to provide a variety of "fail-safe" variable electrical resistance-sensing channels. The accumulating pool of the electrically conductive flow medium M increases the channel conductivity proportional to the immersed length of the resistance electrodes 113–116 which is in direct contact with the fluid medium M which has a greater conductivity.

In its initial, unaccelerated state as shown in FIG. 10A, the flow medium M is contained fully in chamber 101. The resistance monitoring signal between terminals 113A and 113B indicates that resistance electrode 113 is completely immersed in medium M due to the high conductivity reading taken at the terminals 113A and 113B. Electrode connection would be shown to have been established between contact electrode terminal 112 and resistance terminal 113B as well as between contact terminal 105 and resistance terminal 113A. Similarly, the network would indicate that there was electrode connection between contact terminals 105 and 112. Checks of electrical connection between the remaining contact terminals would be negative indicating the absence of flow medium M at locations other than in chamber 101.

The resistance value conductivity checks of resistance electrodes 113–116 are optional in reference to the sequential order of separate terminal channels or in any suitable series, or in parallel-connected probes, for a momentary or sustained period. The resultant data is thereupon recorded, precalibrated and the computer is programmed accordingly.

FIG. 10B illustrates housing 100 in a transition state of rotation about axis A with angular acceleration in direction "L" sustained for a period of time. Flow medium M flows from chamber 101, through capillary passage 6 and then successively into chambers 102, 103 and 104 and then recirculates back into chamber 101. Each successive chamber 102, 103 and 104 retains a pool of a progressively smaller volume of flow medium M due to the restricted flow between variously sized capillary passages 6 and the progressively reduced inertial pressure.

The transition state will progress until rotation slows down and approaches a constant rate, at which time the oblique surface of the pool progressively elongates in relation to the resistance electrode, elongating the surface contact at the periphery. This breaks the electrical contact with the resistance electrode and is computer recorded accordingly. At the instant of constant rotation the entire remaining volume of the pool will be distributed against the outside periphery between the chamber walls by the centrifugal force of the constant rotation. At this state, the extended surface of the flow medium would be curved parallel to the curved resistance electrode directly over the curved surface level of medium M.

The unequal volume distribution of medium M in the chambers would be redistributed until an equilibrium of equal levels is attained through the resistance orifices in all chambers, by means of the centrifugal force which is attained at a constant rotation.

Further rotation of housing 100 in the "L" direction causes the flow medium M to be forced to the outer wall of chamber 102 and then to accumulate by the restriction of capillary passage 6 between chambers 102 and 103 with the presence of the flow medium M being detected first by the establishment of electrical contact between outer contact terminals 106 and 107 and then between contact terminal 107 and terminal 116A. This pattern continues through chambers 103 and 104 and then finally back into chamber 101.

The same typical flow process is sequenced in each successive chamber and then from chamber 104 the flow medium M returns to the original reservoir, chamber 101. This recycling is repeated as long as acceleration is required to be sustained.

Simultaneously, with the detection of the presence or absence of flow medium M between various terminals around the housing 100, the resistance values of resistance electrodes 113, 116, 115 and 114 change as a function of the amount of flow medium M in the respective chamber at any particular point in time. For example, as rotation commences in direction "L" and as flow medium M flows out of chamber 101 into chamber 102, the resistance value for resistance electrode 113 increases. The resistance value of resistance electrode 116, however, begins to decrease as flow medium begins to accumulate in chamber 102. Again, this process is repeated from chamber to chamber around the periphery of the housing 100 with the resistance values for each resistance electrode 101–104 being monitored, transmitted to a computer, and compared against certain predetermined reference points to establish and calculate the speed of acceleration.

It will, of course, be appreciated that when the rotation of housing 100 is constant, flow medium M will be continuously flowing from chamber to chamber and that the outer terminals 105–112 will all indicate the presence of flow medium between them and the resistance values of resistance electrodes 113–116 will, after breaking the contacts with flow medium at constant rotation, remain constant, indicating that the last velocity is the present constant velocity. The subject device is intended, however, to detect and measure acceleration or decleration primarily, but it also monitors a constant speed, and any changes thereof, including 0 speed. Upon reaching a maximum acceleration with beginning deceleration, there will be a corresponding retraction of the flow medium M along the paths previously taken. The corresponding deceleration is monitored and measured in the same manner as acceleration was detected and measured.

Upon resumption of acceleration, with the flow medium M in complete equilibrium in all chambers, the same process which produced the deceleration would be reversed. Thus, in summary, the flow medium will, by the force of its inertia, flow back in a compact pool against the wall of the capillary passage 6 and make a direct immersion contact with the respective resistance electrode again, in all chambers, and the recirculation flow would be resumed. The equal volume and level distribution equilibrium within the chambers would immediately commence to change due to the different flow rates through the flow restricting orifices, with different restrictions between the chambers.

The individual chambers may be monitored separately, but simultaneously, and the acceleration/deceleration rates compared by the computer based on the precalibrated rate coefficient integral factors for integrating summation data of all chambers in radians per second per second.

It will be appreciated that the housing 100 may include virtually any number of chambers. The simplest type of flow conditions of medium M would be within a hollow torus housing such as in FIG. 10A but with only one chamber. In the single chamber embodiment, the original volume of flow medium M would be reduced by the volume of the circulating stream in progress. This reduced volume would be proportional to the rate of flow of medium M by the proportional variation of the electrical resistance of the different optional contact electro channels. If the peripheral path of the stream of flow medium M is exceedingly long or broad transversely, then the entire volume of the pool reservoir may be dissipated within the stream in progress. Also, at extremely high angular acceleration, as within a projectile fired through a rifled barrel, the stream of the flow medium M tends to rapidly pass through the capillary passage 6 with a very high initial force in volume and time so that the supply of fluid medium M must be adequate.

Reversal of rotation of the housing 100 requires rotational deceleration. In the initial stage of deceleration, the surface of the flow medium M pool begins to recede from the resistance electrodes 113–116 at an oblique angle thus increasing the resistance by exposing the electrodes 113–116 proportionally to the rate of reduced acceleration. This will be recognized by the computer which had previously recorded similar retarded accelerations.

This transitional state should progress until rotation slows down and approaches a constant rate at which time the oblique surface of the pool progressively elongates in relation to the resistance electrode, elongating the surface contact at the periphery. This breaks the electrical contact with the resistance electrode and is computer recorded accordingly. At the instant of constant rotation, the entire remaining volume of the pool is distributed against the outside periphery of the chamber walls by centrifugal force caused by the constant rotation. At this point, the extended surface of the flow medium M is parallel to the curved resistance electrode directly over the curved surface level of medium M.

At this sustained constant rotation the flow medium M is subject to centrifugal force only and is distributed through all chambers to equal levels, causing the flow to stop through all connective orifices, with the flow medium in a state of equilibrium.

The state of equilibrium at constant rotation is a prerequisite for ascertaining and monitoring certain external forces, e.g., the angular reorientation of the vehicle axis causes the phenomenon of precession of the flow medium within the constantly rotating housing 100, to surge against the resistance electrodes, in a mass, for the full length in each chamber; or by "wobbling" or eccentricity in relation to center A, the rotation of the vehicle would cause a surge of the flow medium toward the greater rotational radius side, by the centrifugal force in that direction; a change in the rotational rate of the vehicle, either additive or subtractive to the constant rotation of the housing 100 about its axis A would immediately cause the flow medium M to flow through the restrictive capillary passages 6 at different rates; or, due to varied peripheral radii, as in a spiral housing, or due to unequal volume of flow medium in different size chambers, etc., obviously the equilibrium would be unbalanced immediately and the monitoring would be resumed accordingly. As a matter of fact the flow medium could be evenly distributed between the chambers at equal levels and at complete equilibrium prior to the monitoring operation, instead of storing the medium in only one chamber. In order to unbalance the state of equilibrium of all chambers and resume the monitoring with this force-responsive device, it would be necessary to introduce the means for unbalancing in the embodiment, basically by the different flow rates, e.g., varied size orifices, or varied size chambers, or varied size peripheral radii.

The means for unbalancing the equilibrium of the common level distribution of the flow medium in all connected chambers is as follows: by utilizing the phenomenon of varied flow restrictive orifices between chambers; by utilizing the phenomenon of varied inertial pressure between the chambers; by utilizing the phenomenon of varied centrifugal force between the chambers; by utilizing the phenomenon of varied inertial force between the chambers; by utilizing the phenomenon of varied lengths of the chambers; by utilizing the phenomenon of varied volumes of the chambers; by utilizing the phenomenon of precession; and by utilizing the phenomenon of linear acceleration, transversal to the center A axis.

Figure 10C:
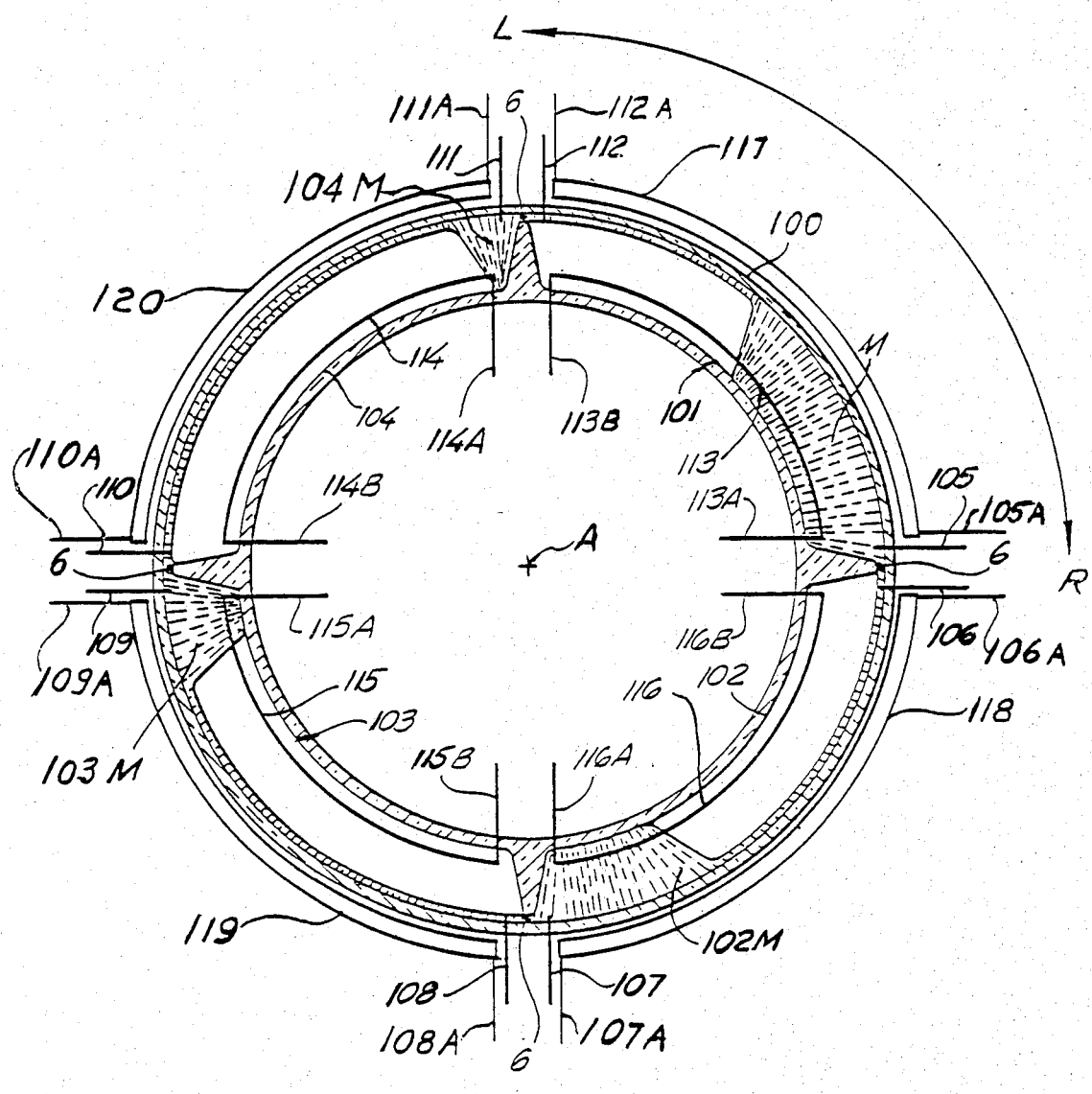
FIG. 10C is similar to FIG. 10B but illustrates a further embodiment of the invention.

FIG. 10C illustrates an embodiment in which the flow medium M is radioactive. The intensity of the radiation in each of the chambers 101–104 is proportional to the amount of flow medium M in the respective chamber 101–104. A radiation detector 117 having leads 105A, 112A measures the intensity of the radiation in the chamber 101; a radiation detector 118 having leads 106A,107A measures the intensity of the radiation in the chamber 102; a radiation detector 119 having leads 108A,109A measures the intensity of the radiation in the chamber 103; and a radiation detector 120 having leads 110A,111A measures the intensity of the radiation in the chamber 104.

Figure 10D:
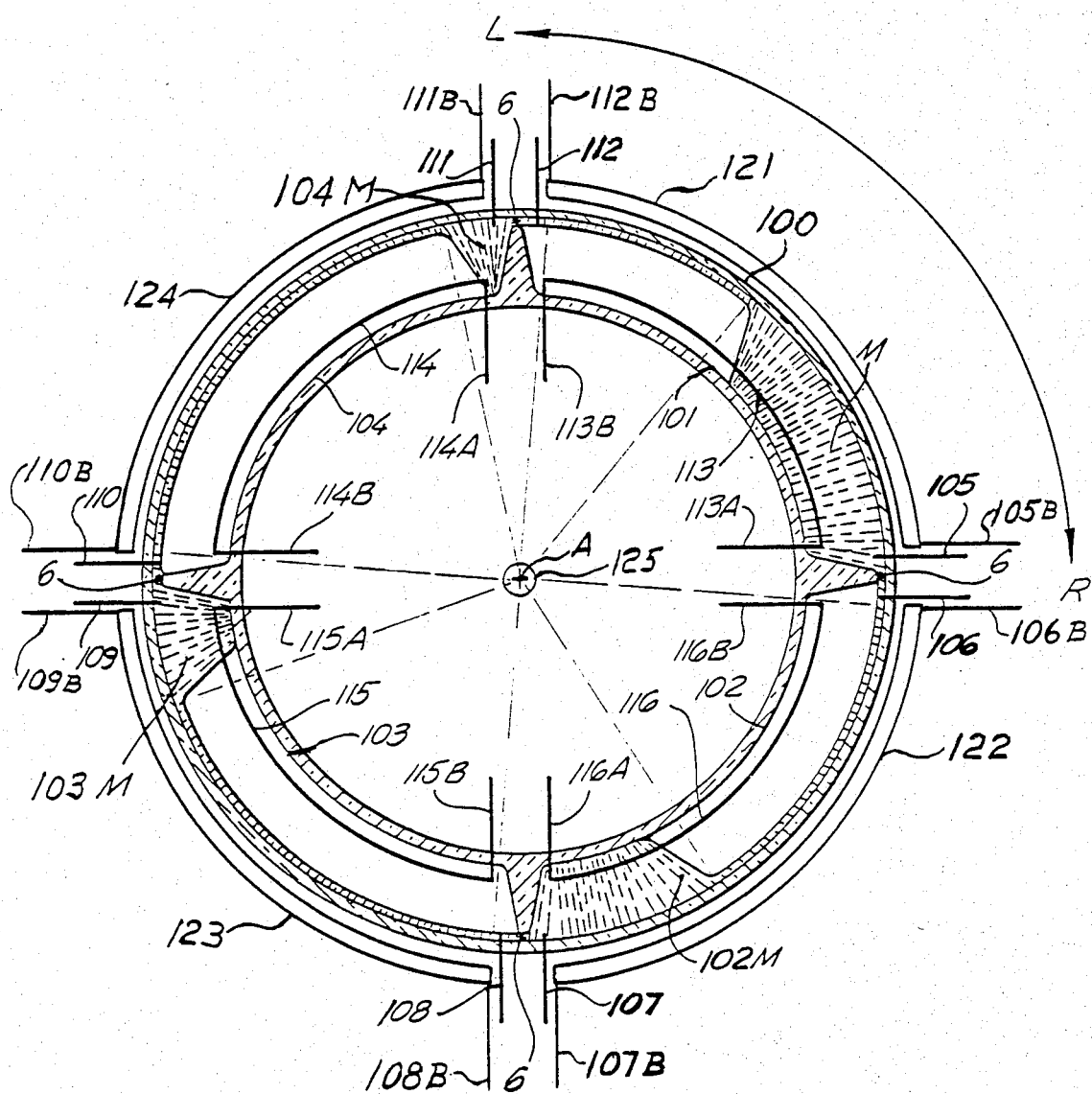
FIG. 10D is similar to FIG. 10C but illustrates an additional embodiment of the invention.

FIG. 10D illustrates an embodiment in which a light source 125 having a predetermined intensity is disposed on the center axis A of the housing 100. The amount of light which passes through each of the chambers 101–104 is proportional to the area of the respective chamber 101–104 which is free of flow medium M, and hence unobstructed. Conversely, the amount of light which passes through each of the chambers 101–104 is inversely proportional to the area of the respective chamber 101–104 which contains flow medium M, that is, inversely proportional to the area of the shadow cast by the flow medium M which is present in the respective chamber 101–104. A photocell 121 having leads 105B,112B measures the amount of light passing through the chamber 101; a photocell 122 having leads 106B,107B measures the amount of light passing through the chamber 102; a photocell 123 having leads 108B,109B measures the amount of light passing through the chamber 103; and a photocell 124 having leads 110B,111B measures the amount of light passing through the chamber 104.

Figures 10E, 10F:
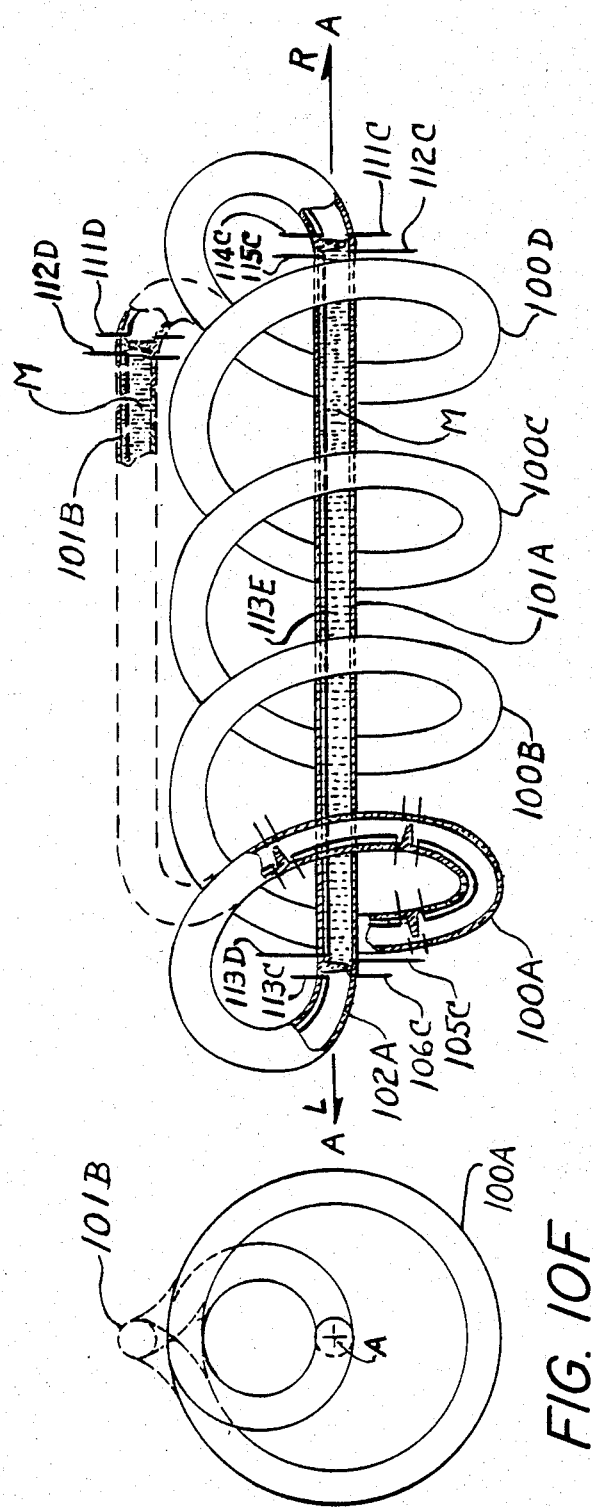
FIG. 10E is an elevational, partly sectional view of yet another embodiment of the invention.
FIG. 10F is a side view of the embodiment of FIG. 10E.

FIGS. 10E and 10F show an embodiment having a helical section 102A which is defined by a series of connected coils 100A, 100B, 100C, 100D located on a common axis A—A. The ends of the helical section 102A are joined to one another by a linear section 101A disposed on the axis A—A or by a linear section 101B which is spaced from but parallel to the axis A—A. The flow path defined by the helical section 102A and the linear section 101A or 101B contains a plurality of flow restricting capillaries as illustrated. Similarly to the embodiment of FIGS. 10A and 10B, electrodes such as 105C,106C,111C,111D,112C    112D,113C,113D,114C are arranged along the flow path, and resistors such as 113E are disposed between neighboring flow restricting capillaries. At rest, the flow medium M may be confined in the linear section 101A or 101B. The embodiment of FIGS. 10E and 10F is capable of monitoring changes in linear velocity and changes in rotational rate simultaneously.

FIGS. 10G–10I illustrate an embodiment in which two planar spiral sections 100E, 100F are arranged parallel to one another and share a common axis A—A. The spiral sections 100E,100F may be directly connected to one another at the axis A—A, as well as at their involute peripheries P. The connections are then normal to the planes of the spiral sections 100E,100F. Alternatively, the ends of the spiral sections 100E, 100F may be joined by a linear section 101C located on the axis A—A, and a second linear section 101D disposed at the involute peripheries P and extending normal to the planes of the spiral sections 100E,100F. The spiral flow path defined by the spiral sections 100E, 100F contains a plurality of flow restricting capillaries as shown. Similarly to the embodiment of FIGS. 10A and 10B, electrodes are arranged along the flow path, and resistors are disposed between neighboring flow restricting capillaries. At rest, the flow medium M may be stored in the linear section 101C, the linear section 101D, the center at the evolute, or at the peripheries P of the involutes.

It will be appreciated that other versions of the principle may be readily employed which use a rotary circulation or recirculation technique. Geometric housing forms which may be utilized include different types of helixes, spirals wound on a cylinder, a cone or a flat plane in coils or with the ends of the spiral connected for recirculation of the fluid medium M or closed for the termination of flow or to be recirculated by the reversal of direction of rotation of the combined, clockwise and counter clockwise-wound spirals. There are obviously a great number of applications for a cylindrical, spiral type monitoring embodiment utilizing speed and acceleration or deceleration. Such a device would have an extended flow time. The utilization of such a device for the combined monitoring of linear and rotational acceleration or deceleration of ballistic projectiles within the gun barrel and in flight trajectory, which also simultaneously monitors the duration of flight, is a significant improvement upon the current state of the art. There are many other diversified applications which should become apparent and obvious to the professionals in this art.

Instead of using light beams which are interrupted in the embodiment of FIG. 11, optical reflections or optical shadows of the medium M might be employed to register and detect movements and/or other displacements of the medium M. Changes in resistivity of a circuit completed through the medium M could also be used for this purpose.

A device according to the invention has a large number of uses, some of which have been outlined in the introductory part of this specification. It can register time, vibrations, centrifugal force, frequency of spin of a body on which it is installed, shock of impact, inertia, change of direction, change of velocity and the presence or absence of gravity.

The flow rate and/or position of the material in the container can be monitored as a function of the variations in the electrical resistance of the material itself or across the electrical contact elements (e.g., electrodes). It can also be monitored by electrical resistance variation through the compartment housing the material (FIG. 11), by required minimum sparking potential through such compartment, by sensing the optical shadow cast by the body of material on the surfaces of the compartment, and by optical reflection from the surface of the body of material (which surface changes as the body changes shape in response to variations in gravity acceleration and the like).

As mentioned earlier, the device according to the invention has a wide range of useful applications. It can be used for programming of multi-stage firing and instrumentation, to control acceleration and deceleration, to register free fall, the existence of zero gravity, orbital velocity or the absence of a gravitational field. It can further be used to measure time and time-delay variations, vibrations, centrifugal force, the rate of spin of a body, the shock of impact, inertia, and changes of velocity and direction of a body. The device can also be employed for integration of gravitational and other forces over a period of time and to make or break electrical contacts. It has uses not only in military and space flight applications but also in commercial applications.

While the invention has been described and illustrated with particular reference to certain embodiments, it should be understood that this has been done only for the purpose of explaining the invention to those concerned with the art. No inference should be drawn that the invention is in any way limited to or by the illustrated embodiments, inasmuch as the scope of protection which it is sought to secure by United States Letters Patent is defined exclusively in the appended claims.

Wherefore, I claim:

1. A device adapted for use in measuring acceleration and/or deceleration of a rotating body, said device comprising:

a housing having wall means defining an endless flow path, said housing being rotatable about an axis which extends transverse to said endless flow path, and said endless flow path including a pair of chambers, and a flow restricting capillary passage connecting said chambers with one another;

a body of flow medium in said path adapted to travel about said path upon rotation of said housing about said axis; and monitoring means provided at preselected positions about said path, said monitoring means being adapted to sense the presence of flow medium at said preselected positions and to sense the amount of flow medium in each chamber so as to measure the acceleration and deceleration of said housing about said axis and indicate the rotational characteristics of said housing.

2. The device of claim 1 wherein said flow path is toroidal.

3. The device of claim 1 wherein said flow path is polygonal.

4. The device of claim 1 wherein said flow path is spiral.

5. The device of claim 1 wherein said flow path is coil shaped.

6. The device of claim 1 wherein said flow path is helical.

7. The device of claim 1 wherein said housing is mounted for free rotation about said axis.

8. The device of claim 1 wherein said housing is mounted for controlled unidirectional and reversible rotation about said axis.

9. The device of claim 1 wherein said more than two chambers are provided about said path, adjacent chambers being interconnected by at least one capillary passage.

10. The device of claim 1 wherein said monitoring means comprises at least one set of terminal electrodes at the respective preselected positions, said electrodes being adapted to continuously sense the presence of flow medium and to transmit a signal to external control means.

11. The device of claim 10 wherein said monitoring means further comprises at least one resistance electrode in each of said chambers, each resistance electrode being adapted to continuously sense the amount of flow medium in the respective chamber during rotation of said housing and to transmit a signal to external control means.

12. The device of claim 1 wherein the rotating body has a center axis and said housing is secured to the rotating body and retained stationary relative to said center axis said axes coinciding.

13. The device of claim 1 wherein said monitoring means comprises at least one detection unit having a light source and a cooperating light detecting element.

14. The device of claim 13 wherein said light detecting element comprises a photocell.

15. The device of claim 1 wherein said flow medium comprises a radioactive substance and said monitoring means includes at least one detector of radioactive emissions.

16. The device of claim 1 wherein said monitoring means comprises at least one detector for detecting optical reflections from said flow medium.

17. The device of claim 1 wherein said monitoring means comprises at least one detector for detecting optical shadows of said flow medium.

18. The device of claim 1 wherein said flow medium is electrically conductive.

19. The device of claim 1 wherein the amount of said flow medium is such that substantially all of said body can be confined in one of said chambers.

20. The device of claim 1 wherein said flow path is under vacuum.

21. The device of claim 1 wherein rotation of said housing is unlimited.

22. The device of claim 1 wherein said axis passes through an area bounded by said path.

* * * * *